US008032506B1

(12) United States Patent
Gregov et al.

(10) Patent No.: US 8,032,506 B1
(45) Date of Patent: Oct. 4, 2011

(54) USER-DIRECTED PRODUCT RECOMMENDATIONS

(76) Inventors: Andrej Gregov, Seattle, WA (US);
Andrew Harbick, Bellevue, WA (US);
Greg Linden, Seattle, WA (US);
Jonathan Pak, Seattle, WA (US); Josh Petersen, Seattle, WA (US)

( * ) Notice: Subject to any disclaimer, the term of this patent is extended or adjusted under 35 U.S.C. 154(b) by 2178 days.

(21) Appl. No.: 09/648,314

(22) Filed: Aug. 25, 2000

(51) Int. Cl.
*G06F 17/30* (2006.01)

(52) U.S. Cl. ........................................... 707/706

(58) Field of Classification Search ............... 707/3, 1, 707/2, 10, 104.1, 200, 706; 705/14, 51; 345/716; 715/539; 340/572.1; 709/229
See application file for complete search history.

(56) References Cited

U.S. PATENT DOCUMENTS

| 5,616,876 | A | * | 4/1997 | Cluts | 84/609 |
| 5,872,850 | A | * | 2/1999 | Klein et al. | 705/51 |
| 5,897,650 | A | * | 4/1999 | Nakajima et al. | 715/539 |
| 6,313,745 | B1 | * | 11/2001 | Suzuki | 340/572.1 |
| 6,412,012 | B1 | * | 6/2002 | Bieganski et al. | 709/232 |
| 6,662,231 | B1 | * | 12/2003 | Drosset et al. | 709/229 |
| 6,850,899 | B1 | * | 2/2005 | Chow et al. | 705/26 |
| 2001/0049623 | A1 | * | 12/2001 | Aggarwal et al. | 705/14 |
| 2002/0154157 | A1 | * | 10/2002 | Sherr et al. | 345/716 |

OTHER PUBLICATIONS

Frakes, William, B., "Information Retrieval, Data Structures & Algorithms," Chapters 2 and 3 (pp. 13-43), Prentice Hall, Inc. 1992.
Baeza-Yates, Ricardo and Ribeiro-Neto, Bertheir, "Modern Information Retrieval," Chapters 1-15 (pp. 1-513), Copyright 1999, ACM Press.

* cited by examiner

*Primary Examiner* — Etienne Leroux
(74) *Attorney, Agent, or Firm* — Knobbe Martens Olson & Bear LLP (57) ABSTRACT

A facility for generating item recommendations is described. In one embodiment, the facility displays a plurality of item indications each indicating an item. The facility then receives user input selecting one or more of the displayed item indications, and selects as seed items the items indicated by the selected item indications. The facility then uses the selected seed items to generate a list of recommended items, and displays the generated list of recommended items.

23 Claims, 8 Drawing Sheets

USER-DIRECTED PRODUCT RECOMMENDATIONS

TECHNICAL FIELD

The present invention is directed to the field of electronic marketing, and, more particularly, to the field of product recommendations.

BACKGROUND

The World Wide Web ("the Web") is a system for publishing information, in which users may use a web browser application to retrieve information, such as web pages, from web servers and display it. Search engines, subject indices, and links between web pages and web sites facilitate the exploration of information published on the Web.

The Web has increasingly become a medium used to shop for products. Indeed, thousands and thousands of different products may be purchased on the Web. A user who plans to purchase a product on the Web can visit the Web site of a Web merchant that sells the product, view information about the product, give an instruction to purchase the product, and provide information needed to complete the purchase, such as payment and shipping information.

Some web merchants provide services for recommending products to users based on profiles that have been developed for such users. A user's profile is commonly based upon a list of products already purchased by the user, or upon the user's responses to a survey about his or her interests.

By recommending additional products to a user in this manner, a web merchant can often sell a recommended product to a user that would not have otherwise purchased it, thereby generating additional sales and profits for the web merchant. Further, such recommendation services often have utility to the user, identifying items that would be useful to the user and of which the user was previously unaware.

While conventional recommendation systems can produce significant benefits, they also have substantial shortcomings. In general, the list of items recommended by a particular recommendation service is fairly static, requiring the user to purchase a number of new items or repeat the survey to update his or her profile and obtain new recommendations. Further, because such recommendation systems require users to use one of these methods to modify the contents of their profile in order to change a set of recommendations, they are relatively inflexible and do not provide a high level of user control. Further, because they are based upon the user's profile, they are not particularly useful either to recommend gifts for others having different interests, or to recommend items to a user that are in a new area of interest to the user that is not reflected in the user's profile.

In view of these disadvantages of conventional recommendation systems, a more flexible recommendation system that afforded a high level of user control would have significant utility.

DETAILED DESCRIPTION

Preferred embodiments of the invention provide a software facility for generating custom, user-directed product recommendations ("the facility"). The facility provides a user interface that enables a user to assemble a list of seed items. For example, the user can add products available for purchase from a web merchant to the list of seed items. Each time the user changes the list of seed items by adding or removing an item, the facility submits the list of seed items to a recommendation engine, and displays the resulting list of recommended items. For example, in order to generate recommendations about books relating to basic digital photography, the user may select as seed items two such books. Because the resulting recommendations are not predicated on a user profile maintained on the user, the facility enables such recommendations to be specifically targeted to items of a particular type, without being diluted by other interests or purchases of the user.

In one embodiment, a key word search is used to generate an initial set of recommendations, from which the user may select seed items. In this embodiment, the user specifies a search string, and the facility performs a key word search on the search string, then submits the top items in the key word search results to the recommendation engine. Additionally, various other flexible techniques are supported for locating and adding seed items.

In this way, the facility provides a convenient and powerful tool for users to generate directed product recommendations not hampered by extraneous user profile information. Embodiments of the facility are particularly useful to generate recommendations for a gift to be given to another by a user.

Figure 1:
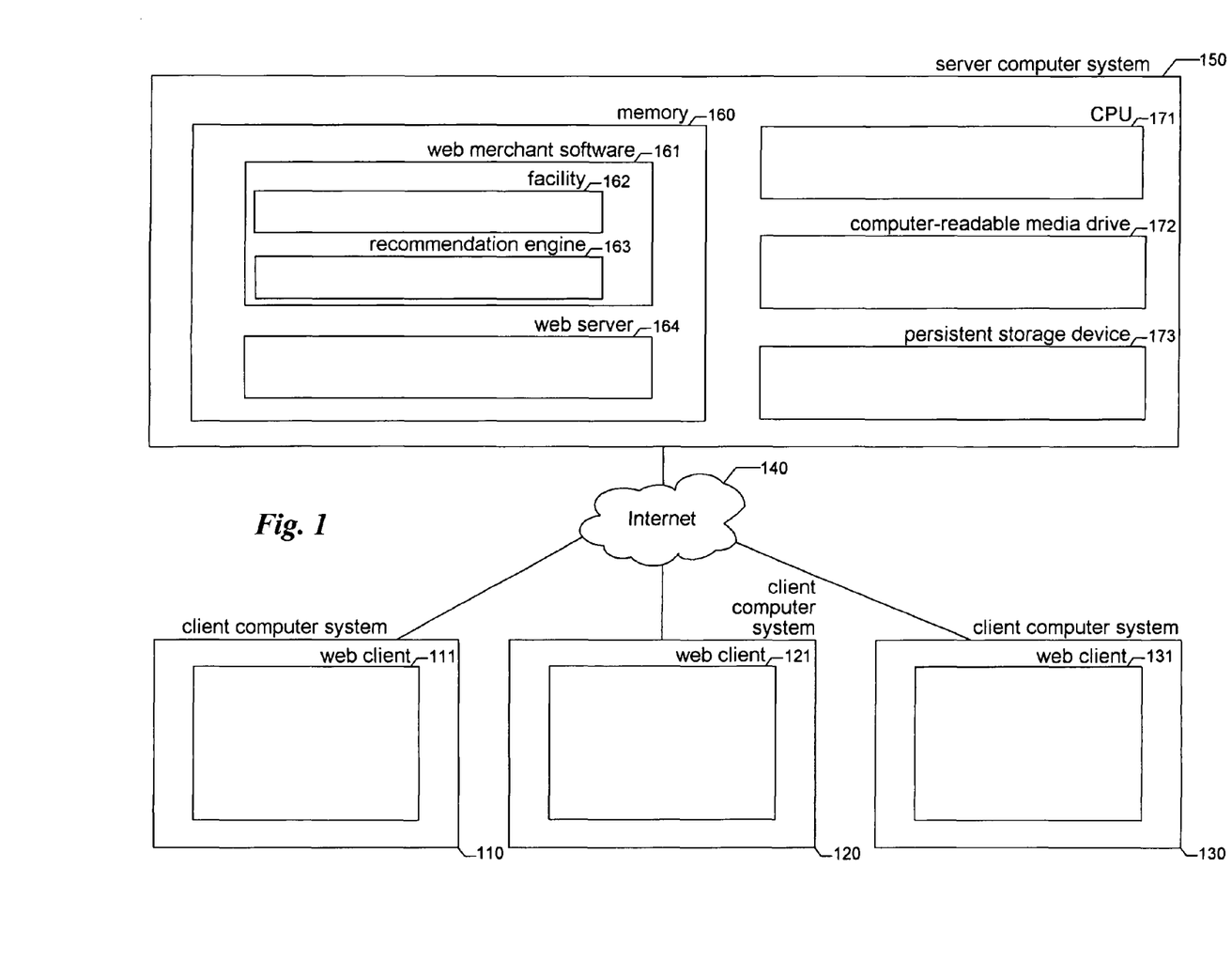
FIG. 1 is a high-level block diagram showing the environment in which the facility preferably operates.

FIG. 1 is a high-level block diagram showing the environment in which the facility preferably operates. The block diagram shows several client computer systems, such as client computer systems 110, 120, and 130. Each of the client computer systems has a web client computer program for browsing the World Wide Web, such as web clients 111, 121, and 131. The client computer systems are connected via the Internet 140 to a server computer system 150 hosting the facility. Those skilled in the art will recognize that client computer systems could be connected to the server computer system by networks other than the Internet, however.

The server computer system 150 contains a memory 160. The memory 160 preferably contains merchant software 161 incorporating both the facility 162 and a recommendation engine 163 preferably used by the facility. The recommendation engine preferably receives a list of "seed items," such as items sold by the web merchant, and returns a ranked list of items to recommend to a user who is interested in the seed items. In one embodiment, the recommendation engine is as described in U.S. patent application Ser. No. 09/157,198, which is hereby incorporated by reference in its entirety.

The memory preferably further contains a web server computer program 164 for delivering web pages in response to requests from web clients. While items 161-164 are preferably stored in memory while being used, those skilled in the art will appreciate that these items, or portions of them, maybe be transferred between memory and a persistent storage device 172 for purposes of memory management and data integrity. The server computer system further contains one or more central processing units (CPU) 171 for executing programs, such as programs 161-164, and a computer-readable medium drive 173 for reading information or installing programs such as the facility from computer-readable media, such as a floppy disk, a CD-ROM, or a DVD.

While preferred embodiments are described in terms in the environment described above, those skilled in the art will appreciate that the facility may be implemented in a variety of other environments including a single, monolithic computer system, as well as various other combinations of computer systems or similar devices connected in various ways. In particular, the facility may interact with users via a wide range of portable and/or wireless user interface devices, such as cellular telephones, pagers, personal digital assistants, etc.

Figure 2A:
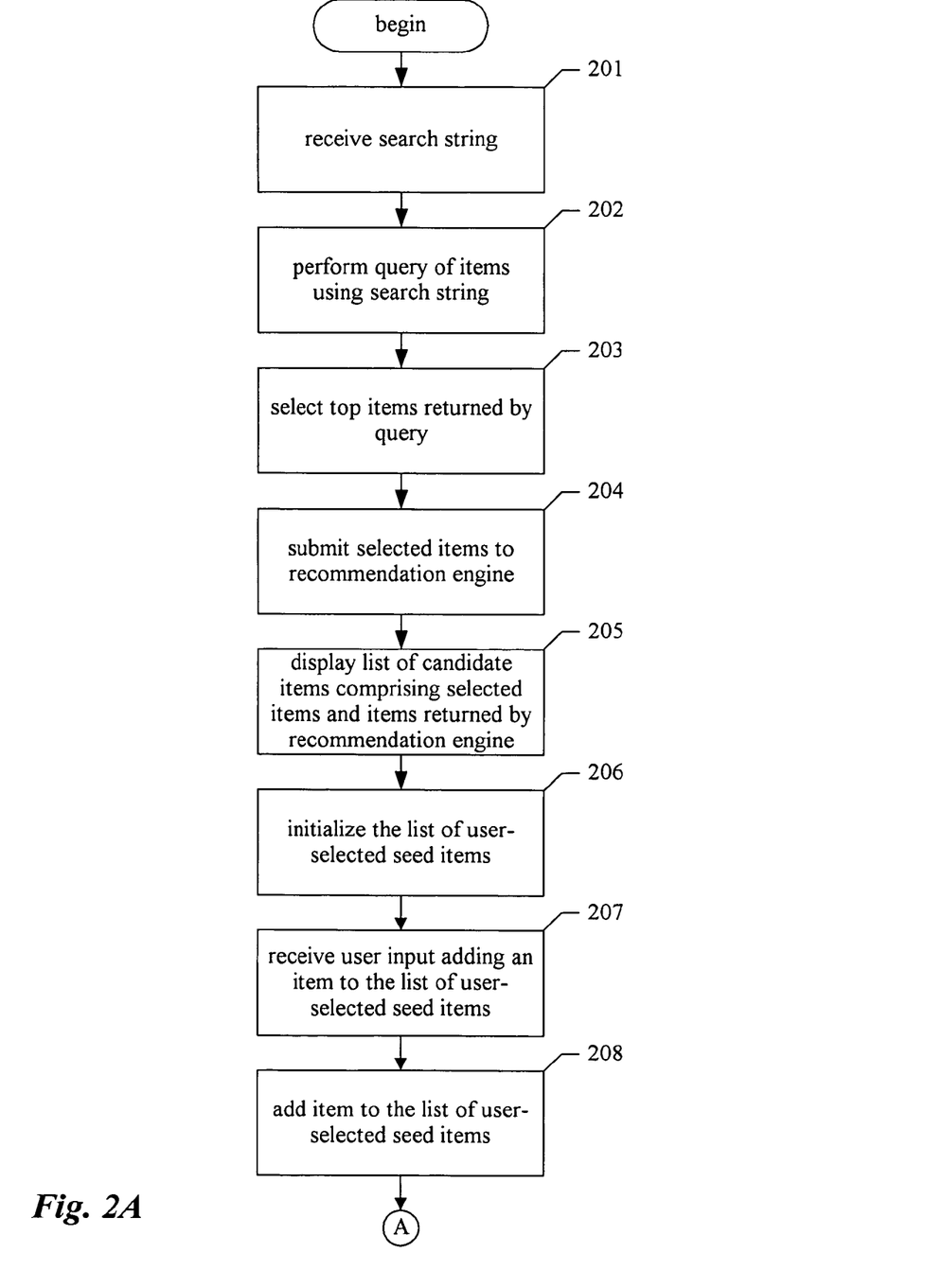
FIGS. 2A-2B are a flow diagram showing the steps preferably performed by the facility.
Figure 2B:
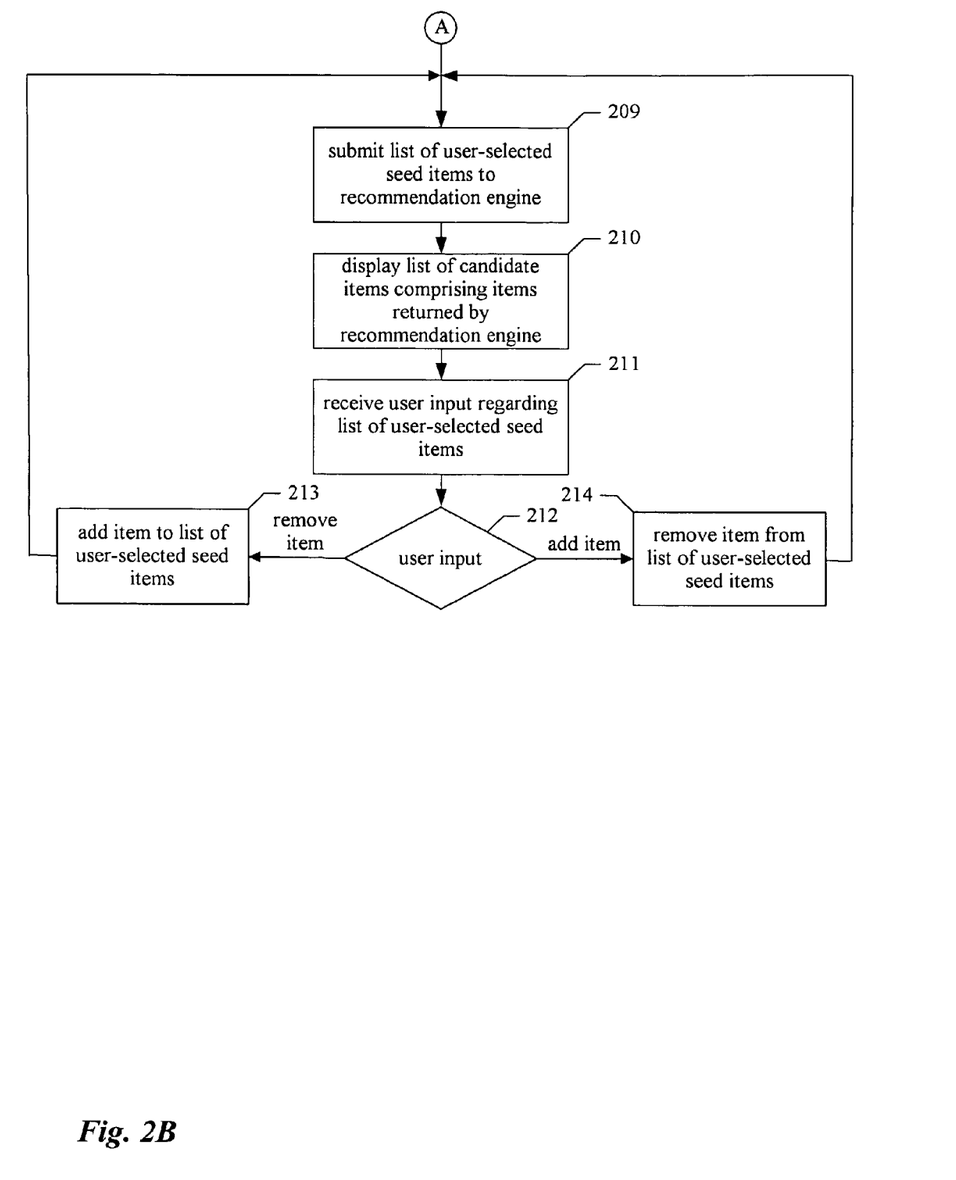

FIGS. 2A-2B are a flow diagram showing the steps preferably performed by the facility. In step 201, the facility receives a search string from the user. In step 202, the facility performs a query of the items available for sale from the merchant using the search string received in step 201. In step 203, the facility selects the top items returned by the query performed in step 202. In one embodiment, step 203 is performed in accordance with the top item selection process described in U.S. patent application Ser. No. 08/928,555, which is hereby incorporated by reference in its entirety.

In step 204, the facility submits the item selected in step 203 to the recommendation engine as recommendation seeds. In step 205, the facility displays a list of candidate items comprising the items selected in step 203 and the items returned by the recommendation engine. In step 206, the facility initializes a list of user-selected seed items to be empty. In step 207, the facility receives user input adding an item displayed in the list of candidate items to the list of user-selected seed items initialized in step 206. In step 208, the facility adds to the list of user-selected seed items the item that was the subject of the user input received in step 207. After step 208, the facility continues in step 209 via connector A.

In step 209, the facility submits the list of user-selected seed items to the recommendation engine as recommendation seeds. In step 210, the facility displays a list of candidate items comprising only the items returned by the recommendation engine. In step 211, the facility receives further user input regarding the list of user-selected seed items. In step 212, the facility branches on the nature of the user input received in step 211. If the user input received in step 211 is to add an item to the user-selected seed items list, then the facility continues in step 213, else if the user input received in step 211 is to remove an item from the list of user-selected seed items, then the facility continues in step 214. In step 213, the facility adds the indicated item to the list of user-specified seed items. After step 213, the facility continues in step 209 to submit the augmented list of user-selected seed items to the recommendation engine. In step 214, the facility removes the indicated item from the list of user-specified seed items. After step 214, the facility continues in step 209 to submit the reduced list of user-selected seed items to the recommendation engine.

Those skilled in the art will appreciate that various subsets of the steps shown in FIG. 2 may be performed by the facility. For example, the facility may perform steps 201-205 without performing the remainder of the steps. Alternatively, the facility could use any set of steps to generate a list of user-selected seed items, then perform steps 209-214 to display recommendations based upon that list of seed items and permit the user to refine the list of seed items.

To more fully illustrate its implementation and operation, the facility is described in conjunction with an example.

FIGS. 3-7 are display diagrams showing sample displays produced an exemplary embodiment of the facility. These displays may be served from a web server and displayed in a web browser, or conveyed to the user in a variety of other ways.

Figure 3:
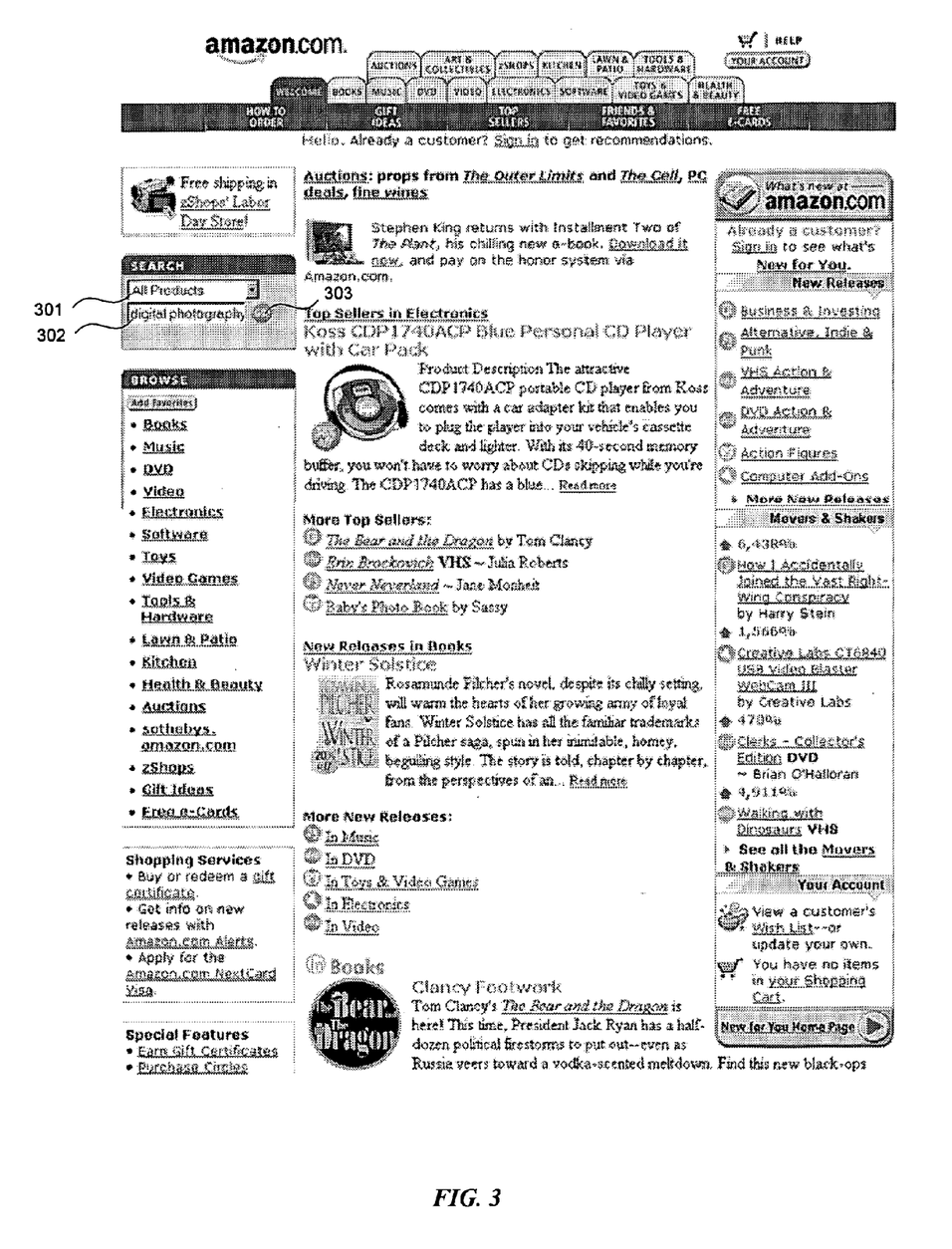
FIG. 3 is a display diagram showing an initial display.

FIG. 3 is a display diagram showing an initial display. The initial display includes search controls 301-303. The user uses the search controls by typing into the search string field 302 one or more words relating to items in which the user is interested. For example, the diagram shows that the user has typed the search string "digital photography" into the search string field. After doing so, the user clicks on the search button 303. Optionally, the user may use item category listbox 301 to select an item category to which to restrict the recommendations. If the user fails to do so, the facility preferably performs a search of all item types.

Figure 4:
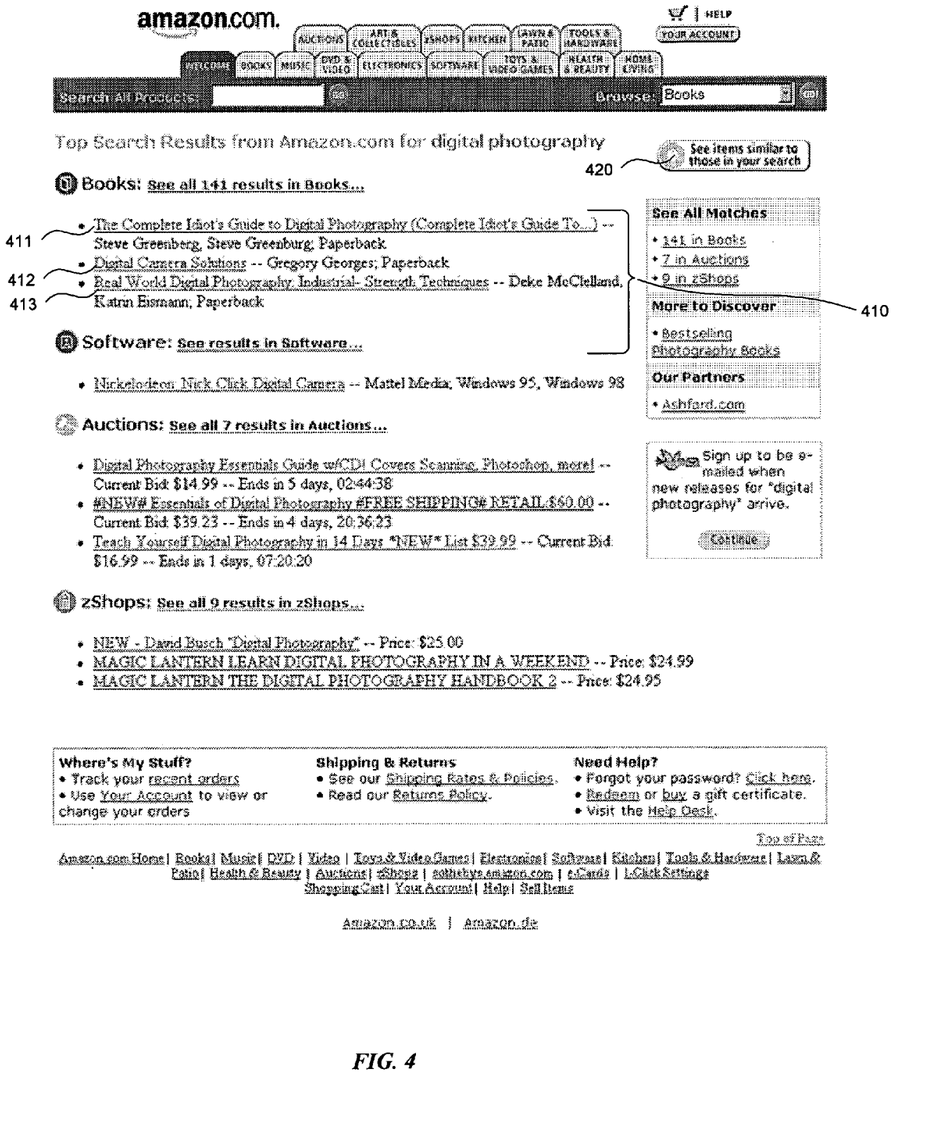
FIG. 4 is a display diagram showing sample search results.

FIG. 4 is a display diagram showing sample search results. It can be seen that the search has produced a number of items, including book items 411-413, that are the most relevant to the search string inputted as shown in FIG. 3. The search results are preferably accompanied by a recommendations button 420. The user preferably clicks the recommendations button in order to obtain recommendations that are based upon the top three items in the search result.

Figure 5:
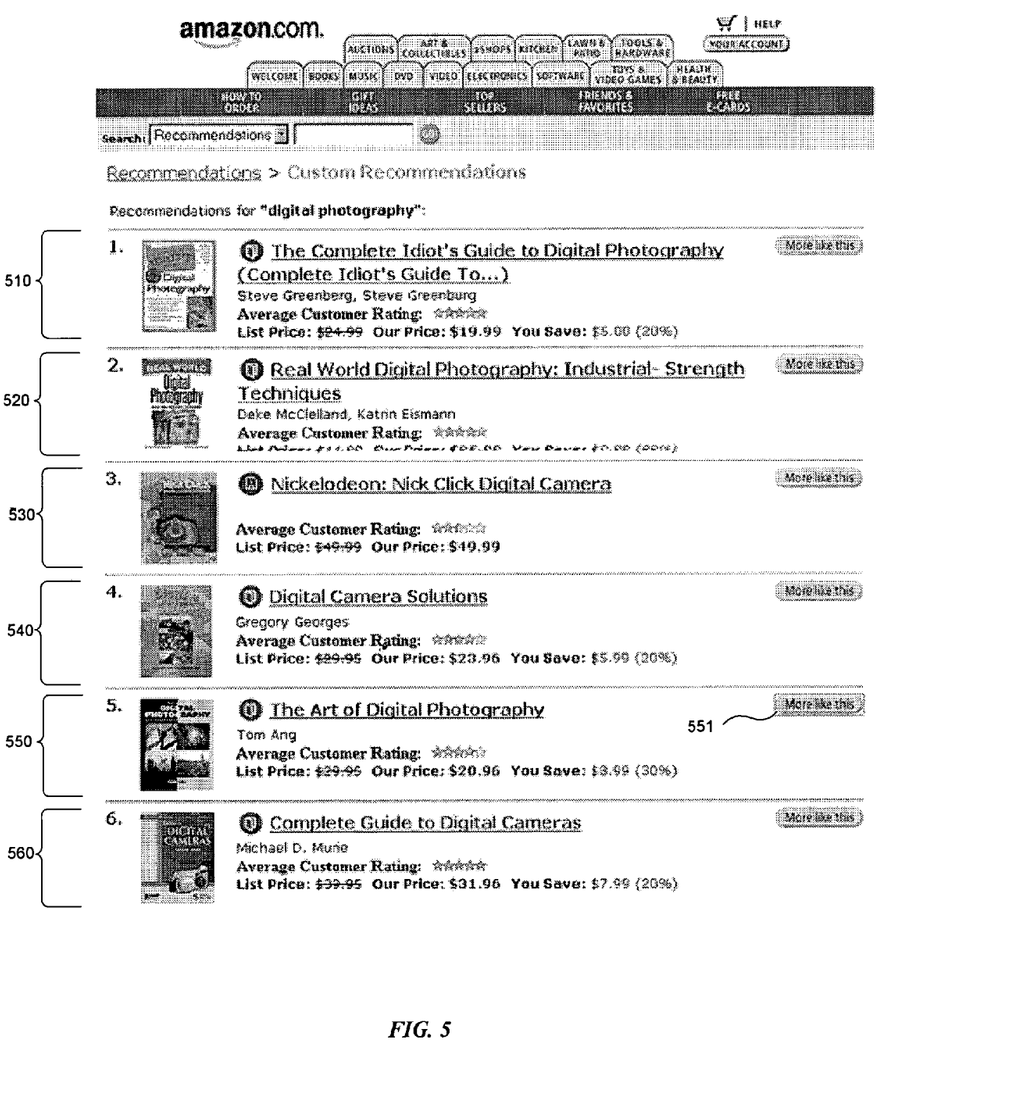
FIG. 5 is a display diagram showing a list of recommendations based upon the sample search.

FIG. 5 is a display diagram showing a list of recommendations based upon the sample search. The diagram shows six recommended items 510, 520, 530, 540, 550, and 560. Items 510, 540, and 520 are the top three items returned in the search result, shown as items 411, 413 and FIG. 4. Items 530, 550, and 560 are among the items returned by the recommendation engine when seeded with the top three items from the search. Thus, the recommended items shown in FIG. 5 are a combination of the top items returned by the search and recommendations based upon these top items.

FIG. 5 further shows a button for each recommended item, labeled "more like this" that the user may click in order to base a new set of recommendations on the item. For example, the user may click button 551 in order to base a new set of recommendations on item 550, a book entitled "The Art of Digital Photography."

Figure 6:
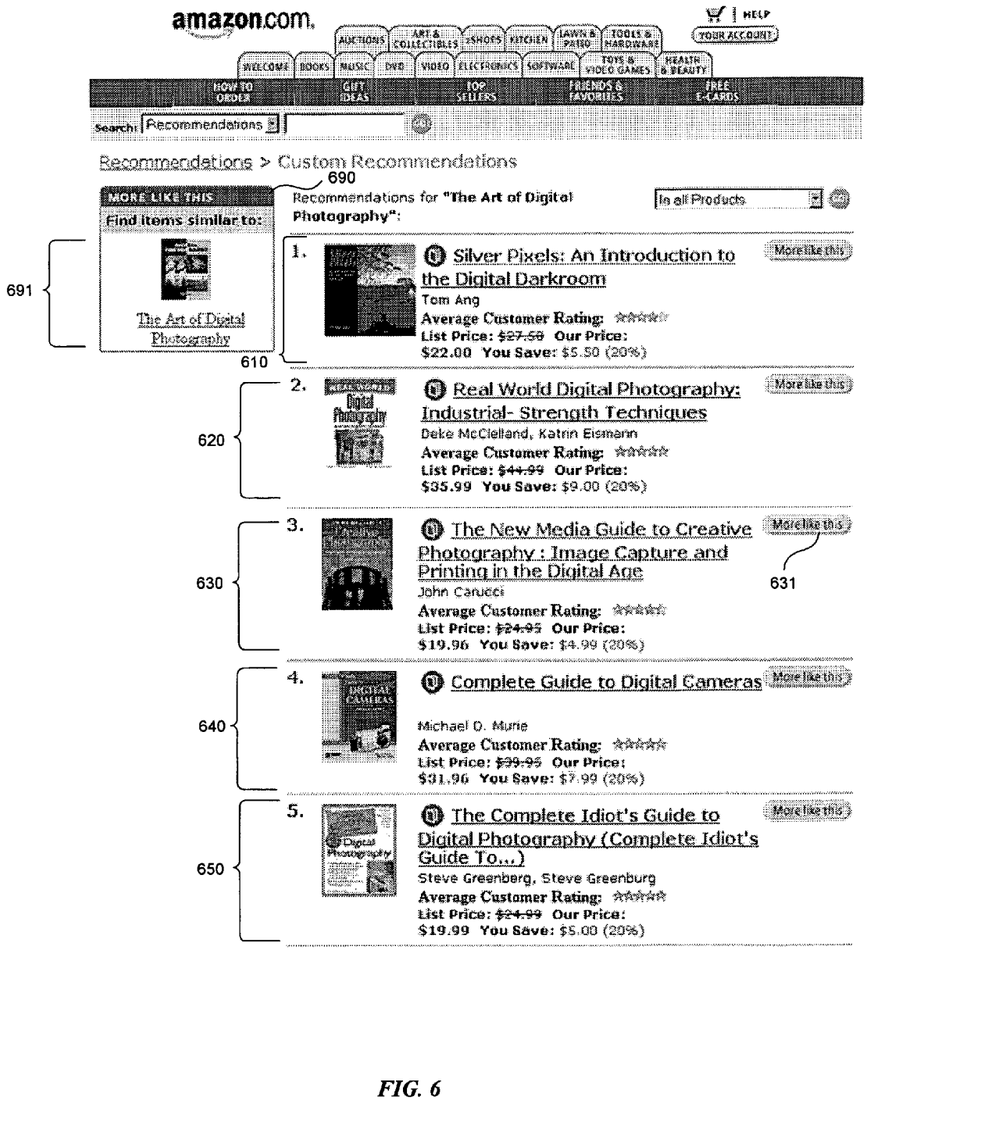
FIG. 6 is a display diagram showing a sample set of recommendations displayed by the facility based upon a user-specified seed item.

FIG. 6 is a display diagram showing a sample set of recommendations displayed by the facility based upon a user-specified seed item. FIG. 6 is preferably displayed in response to the user clicking on button 551 shown in FIG. 5. It can be seen that FIG. 6 contains a list 690 of user-specified seed items. In FIG. 6, this list of seed items contains only one seed item, item 691 corresponding to item 550 shown in FIG. 5. FIG. 6 also shows a list of recommended items 610, 620, 630, 640, and 650. These recommended items are based upon using item 691 alone as a seed for the recommendation engine. At this point, the user may add additional seed items to the list of user-specified seed items by clicking a "more like this" button associated with a new seed item. For example, the user may click button 631 in order to add item 630 to the list of user-specified seed items.

Figure 7:
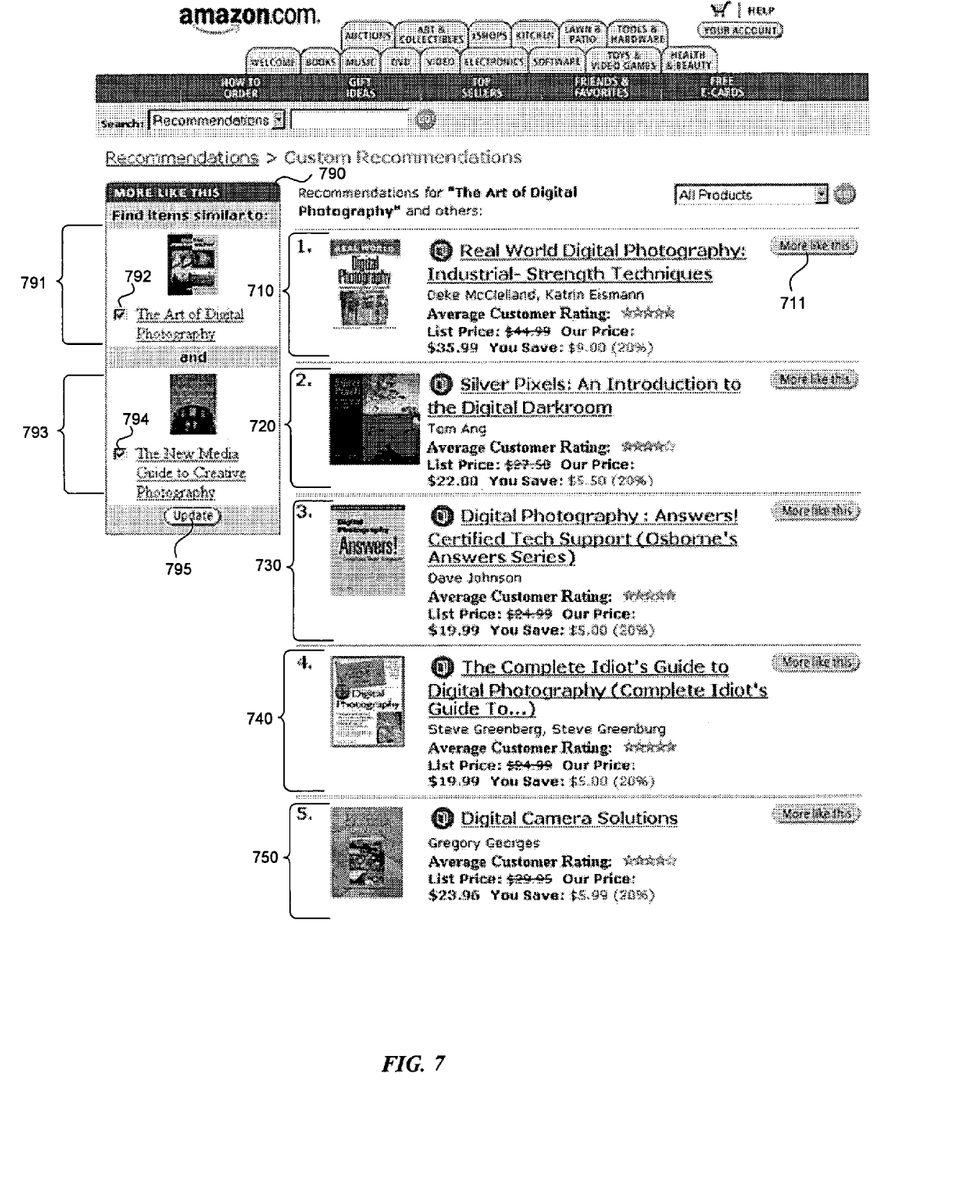
FIG. 7 is a display diagram showing the display of a revised set of recommended items based upon an expanded list of user-selected seed items.

FIG. 7 is a display diagram showing the display of a revised set of recommended items based upon an expanded list of user-selected seed items. The display shown in FIG. 7 is preferably generated in response to the user clicking on button 631 shown in FIG. 6. As a result, the facility has added seed item 793 to the list 790 of the user-selected seed items. The list of recommended items 710, 720, 730, 740, and 750 is correspondingly revised to include items recommended based upon these two seed items. At this point, the user may further expand the list of user-selected seed items by clicking one of the "more like this" buttons, such as button 711. The user may also remove seed items from the list of user-selected seed items by unchecking one or more of the check boxes 792 and 794, then clicking update button 795. For example, to remove item 793 from the list of user-selected seed item 790 and return to the display of FIG. 6, the user could uncheck check box 794 for item 793, then click the update button 795.

Various other embodiments of the facility may produce a sequence of events other than those depicted in FIGS. 3-7. For example, one embodiment of the invention produces only the sequence of events shown in FIGS. 3-5, enabling the user to display further information about or purchase one or more of the recommended items shown in FIG. 5. In other embodiments of the facility, various other techniques are used to generate the list of user-selected seed items shown in FIGS. 6 and 7. In some embodiments, this list is generated without performing a key word search as shown in FIGS. 3 and 4. As some examples, embodiments of the facility may enable a user to add seed items to the list of user-selected seed item by displaying buttons similar to the "more like this" buttons shown in FIGS. 5-7 in conjunction with various displays of items and item categories, such as on item detail pages, user purchase history lists, editorial content discussing items and item categories, etc. In additional embodiments, the user may drag items from various other portions of the display into the list of user-selected seed items, or out of this list. In this manner, the user maybe flexibly assemble the list of seed items used by the facility to generate a list of recommended items.

It will be understood by those skilled in the art that the above-described facility could be adapted or extended in various ways. For example, the facility can be straightforwardly adapted to support a wide variety of user interface techniques for modifying the list of user-specified seed items. Also, the facility may be operated either by a web merchant, by a third party recommendation service, or by companies engaged in other businesses. Further, while the facility is described above as interacting with users in real-time via the Web, additional embodiments of the facility interact with users via other types of communication and messaging schemes, including electronic mail messaging, instant messaging, and pager messaging. While the foregoing description makes reference to preferred embodiments, the scope of the invention is defined solely by the claims that follow and the elements recited therein.

We claim:

1. A method in a computing system for generating item recommendations for a user, comprising:
   receiving requests from the user to display information about each of a plurality of items;
   selecting as seed items the plurality of items that were displayed;
   generating a list of recommended items each based on the selected seed items, wherein the generated list does not contain the selected seed items; and
   displaying the generated list of recommended items to the user.

2. The method of claim 1 further comprising removing an item from the plurality of items selected as seed items in response to a request from the user.

3. The method of claim 1 further comprising adding an item to the plurality of items selected as seed items in response to a request from the user.

4. The method of claim 1 further comprising displaying a control for removing items from the plurality of items selected as seed items.

5. The method of claim 4 wherein the control is a button that is selected by the user clicking the button.

6. The method of claim 4 wherein the control is a draggable representation of the item together with a destination region, and wherein the control is selected by the user by dragging the draggable representation of the item to the destination region.

7. The method of claim 1 wherein all of the received requests are received during a distinguished browsing session.

8. A method in a computing system for specifying a request for product recommendations, comprising:
   for each of a plurality of groups of one or more products, displaying information describing products in the group;
   for each of at least a portion of the plurality of product groups, displaying in conjunction with the information describing products in the group a control for selecting products in the group as recommendation seeds; and
   when a displayed control is selected by a user, adding to a list of recommendation seeds products in the group in conjunction with which the selected control is displayed,
so that the list of recommendation seeds contains products in the groups whose controls are selected by the user and the list of recommendation seeds can be used to generate a list of recommended items each based on the recommendation seeds that are selected, wherein the generated list does not contain the recommendation seeds that are selected.

9. The method of claim 8, further comprising generating a product recommendation based upon the list of recommendation seeds.

10. The method of claim 8 wherein the information displayed for a distinguished one of the product groups describes a product category containing products in the distinguished group.

11. The method of claim 8 wherein the information displayed for a distinguished one of the product groups describes a product genre containing products in the distinguished group.

12. The method of claim 8 wherein a distinguished one of the product groups comprises a single product, and wherein the information displayed for the distinguished product group describes the product that comprises the product group.

13. The method of claim 8 wherein a distinguished one of the product groups comprises products that are recordings of a single artist, and wherein the information displayed for the distinguished product group describes the artist.

14. The method of claim 8 wherein a distinguished one of the product groups comprises products that are books written by a single author, and wherein the information displayed for the distinguished product group describes the author.

15. The method of claim 8 wherein the control displayed for a distinguished product group is a button that is selected by the user by clicking the button.

16. The method of claim 8 wherein the control displayed for a distinguished product group is a draggable portion of the information describing the product group, together with a destination region, and wherein the control displayed for the distinguished product group is selected by the user by dragging the draggable portion of the information describing the product group to the destination region.

17. A method in a computing system for generating item recommendations for a user, the user having a persistent user profile, comprising:
   displaying a plurality of item indications to the user each indicating an item;

receiving input from the user comprising a selection of each of a plurality of the displayed item indications as seed items;

generating a list of recommended items each based on the selected seed items, wherein the generated list does not contain the selected seed items; and displaying the generated list of recommended items to the user.

18. The method of claim 17 further comprising removing an item from the plurality of items selected as seed items in response to a request from the user.

19. The method of claim 17 further comprising adding an item to the plurality of items selected as seed items in response to a request from the user.

20. The method of claim 17 wherein the received input explicitly comprises a selection of each of a plurality of the displayed item indications as seed items.

21. The method of claim 17 further comprising displaying a control for removing items from the plurality of items selected as seed items.

22. The method of claim 21 wherein the control is a button that is selected by the user clicking the button.

23. The method of claim 21 wherein the control is a draggable representation of the item together with a destination region, and wherein the control is selected by the user by dragging the draggable representation of the item to the destination region.

* * * * *